United States Patent [19]

Konopka

[11] Patent Number: 4,916,569

[45] Date of Patent: Apr. 10, 1990

[54] SHORT CIRCUIT PROTECTION FOR SWITCH MODE POWER SUPPLY

[75] Inventor: John G. Konopka, Barrington, Ill.

[73] Assignee: Zenith Electronics Corporation, Glenview, Ill.

[21] Appl. No.: 267,203

[22] Filed: Nov. 4, 1988

[51] Int. Cl.⁴ .............................................. H02H 7/00
[52] U.S. Cl. ........................................ 361/18; 361/86; 361/87; 361/92; 361/93; 323/271; 323/299
[58] Field of Search .................. 361/18, 86, 88, 92, 361/87; 323/234, 299, 265, 271, 277

[56] References Cited

U.S. PATENT DOCUMENTS 4,177,389 12/1979 Schott ............................. 323/271 X
4,736,264 4/1988 Segger ................................... 361/62

Primary Examiner—Derek S. Jennings

[57] ABSTRACT

A protection circuit for a switched mode power supply has a reference voltage applied through a resistor to a first input terminal of a comparator. The second input terminal of the comparator is supplied with an indicating voltage that is a function of the magnitude of input current to the supply. A capacitor precludes rapid changes in the voltage applied to the second input terminal. When a trip level is reached, the comparator operates a latch for disabling the pulse width modulator of the supply. A diode is coupled between the high capacity voltage output of the supply and the first input terminal of the comparator for rapidly changing the voltage applied to the first input terminal to operate the latch, in response to a significant decrease in voltage at the high capacity output.

8 Claims, 2 Drawing Sheets

TRANSFORMER CURRENT

OUTPUT VOLTAGE

SHORT CIRCUIT PROTECTION FOR SWITCH MODE POWER SUPPLY

BACKGROUND OF THE INVENTION AND PRIOR ART

This invention relates generally to a protection circuit for a switched mode power supply (SMPS) and specifically to a low cost, fast acting over-current protection circuit for such supplies.

Switched mode power supplies are extensively used because of their high efficiency in supplying varying output load current requirements. They conventionally include a developed source of DC voltage supplying a pair of transistor switches that control current flow in the primary of a power transformer. The secondaries of the power transformer are in turn coupled to rectifier networks for developing different DC output voltages. The transistors are switched or driven by a pulse width modulator (PWM) that, in turn, is coupled to an output of the SMPS for changing the duty cycle of the switching transistors in accordance with load current requirements.

Many such power supplies use a current sensing transformer in series with the switching transistors and the primary of the power transformer for sensing overloads in the primary winding current. The sensing transformer develops an AC voltage in its secondary winding that is proportional to current flow in its primary winding. This current is the power transformer primary current which is also the input current to the SMPS. The sensed output voltage is rectified to produce an indicating voltage which is applied to one input of a voltage comparator, the other input of which is supplied with a fixed reference voltage. The output of the voltage comparator is coupled to a latch circuit that is effective for shutting down the PWM when the comparator senses that excessive input current is flowing in the power transformer primary winding.

Switched mode power supplies are relatively slow in changing the duty cycle of the switching transistors in response to output load current changes. The slow response is generally desirable because a rapid response to output current changes could easily result in undesirable "hunting." The slow response time of the SMPS does, however, give rise to difficulty in the event of a large over-current or a short circuit condition existing at a high current capacity voltage output.

The reference voltage is normally established at a value that is higher than the indicating voltage developed by the sensing circuit under the highest peak input current encountered during normal operating conditions. This point usually occurs during load step changes with the supply operating at normal levels. For example, the load current may change from a low value to a high value and result in peak input currents that are many times greater than the currents existing under steady state maximum power output conditions. An SMPS with a maximum power output of 200 watts would experience peak currents of about 4 amperes in its power transformer primary winding. During normal load step changes, the primary current could peak at 8 amperes. For such a supply, the over current trip point would therefore be set at more than 8 amperes. Ten amperes is a reasonable shutdown or trip level for such a supply. When the SMPS output circuits are lightly loaded (operation with minimum load), a short circuit across a low voltage, high current capacity output will result in most of the output power being dissipated in the short circuit. For a 5 volt high capacity output and a 10 ampere primary current shutdown level, input power would rise to 850 watts or more with current flow into the short circuit reaching 100 amperes before shutdown occurs. Such high currents exert great stress on the SMPS system components and could be very destructive to the load that caused the short circuit.

With the protective circuit of the invention, the switched mode power supply functions normally with respect to input shutdown current capability, but will shut down at a very much lower input current level under a short circuit condition. The benefits of the invention are achieved with a few additional low cost parts and only minor changes in circuitry.

OBJECTS OF THE INVENTION

A principal object of the invention is to provide an improved shutdown circuit for a switched mode power supply.

Another object of the invention is to provide a high speed over-current protection circuit for a switched mode power supply.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
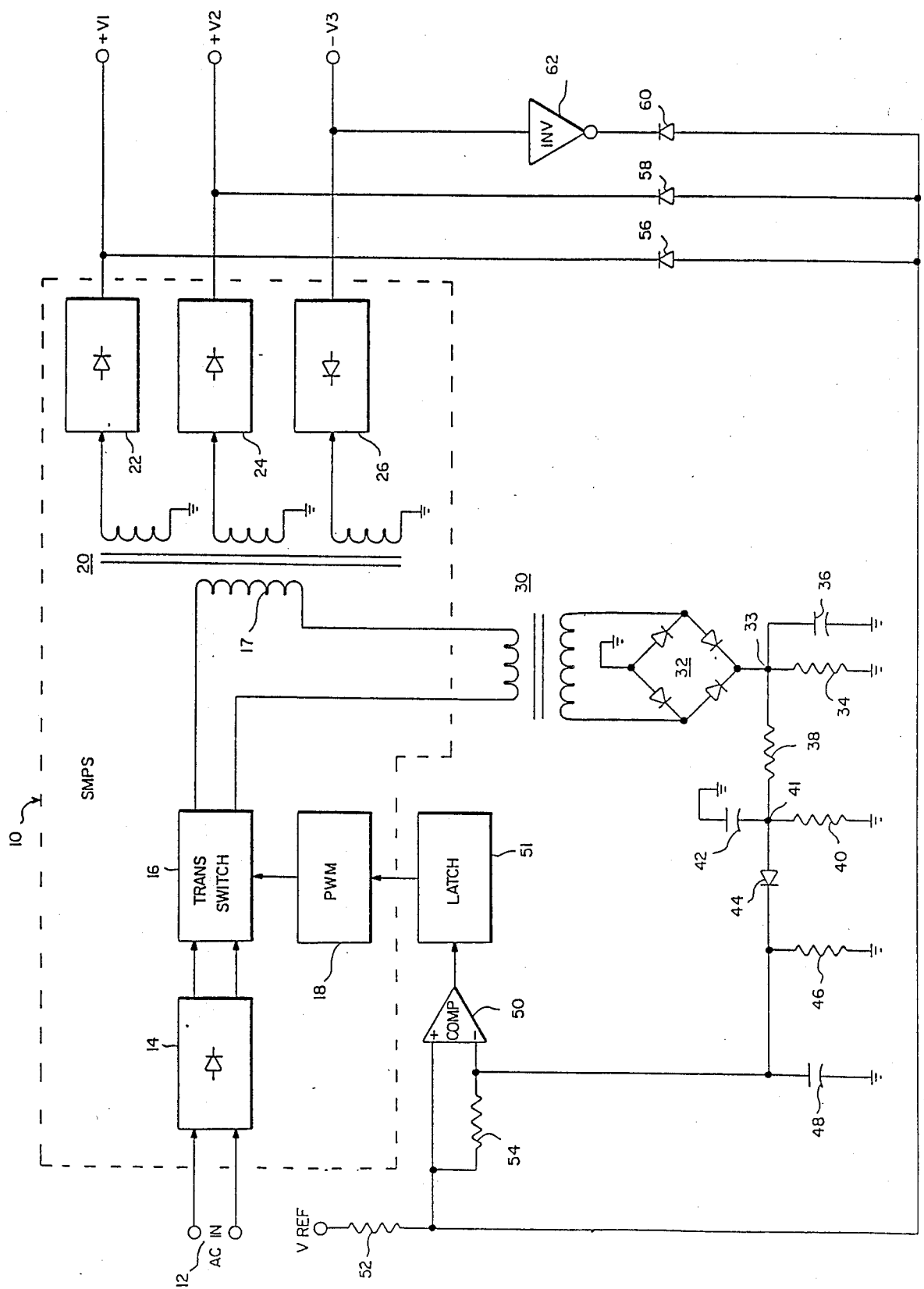
FIG. 1 is a partial block, partial schematic diagram illustrating the invention.

In FIG. 1 a switched mode power supply is generally indicated by the dashed line block 10. Supply 10 is coupled to a pair of AC input terminals 12 and includes a rectifier means 14 that supplies transistor switching means 16, which is driven by pulse width modulator means 18. The transistor switching means 16 supplies a primary winding 17 of a power transformer 20 that includes a plurality of secondary windings. A corresponding plurality of rectifier networks such as networks 22, 24 and 26 are connected to individual ones of the secondary windings and in turn supply output terminals with voltages +V1, +V2 and −V3. An input current sensing transformer 30 includes a primary winding that is in series with the primary winding 17 of power transformer 20 and a secondary winding that supplies a bridge connected rectifier arrangement 32 for developing a DC indicating voltage at an output terminal 33. Terminal 33 is connected to ground through a resistor 34 and a parallelly connected capacitor 36. Terminal 33 is also connected to a voltage divider consisting of a series connection of a pair of resistors 38 and 40, the junction 41 of which is connected to ground through a capacitor 42. These resistors and capacitors wave shape and voltage divide the indicating voltage, which appears at junction 41. Junction 41 is connected to the anode of a diode 44, the cathode of which is connected to parallel combination of a resistor 46 and a capacitor 48, the other ends of which are connected to ground. The cathode of diode 44 is also connected to the negative terminal of a comparator 50, the positive terminal of which is connected to a reference voltage source VRef through a resistor 52. A resistor 54 interconnects the positive and negative terminals of comparator 50. The output of comparator 50 is connected to a latch circuit 51 that in turn is connected to a PWM 18.

With the exception of diode 44, resistors 46 and 52 and capacitor 48, the circuit is conventional and is in the prior art. It will also be appreciated that PWM 18 is generally controlled by circuitry that is responsive to the voltage at one or more of the output terminals of the SMPS for changing the duty cycle of the switching transistors 16 as a function of changes in load current. This circuitry is omitted for purposes of clarity as it is independent of the present invention. Similarly conventional protection circuitry for shutting down the SMPS power supply in the event the voltage at the output terminals rises above a predetermined level is also omitted.

The positive terminal of comparator 50 is connected to each of the SMPS output terminals through corresponding diodes. Thus diode 56 connects the positive terminal of comparator 50 to the output labelled +V1 and diode 58 connects the terminal to the output labelled +V2. A diode 60 is similarly connected, but through an inverter 62, to the output labelled y−V3. These diodes (and an inverter for a negative output) and the resistors 46 and 52, capacitor 48 and diode 44 constitute the parts that have been added for carrying out the invention.

In operation, SMPS 10 develops a current in the primary winding of sensing transformer 30 which, in turn, develops an indicating voltage at terminal 41. An indicating voltage of 4.6 volts is produced when 10 amperes is flowing in the primary of sensing transformer 30. VRef is developed by a stable 4.0 volt supply (not shown) and resistors 52, 54 and 46 result in 3.5 volts being developed at the negative terminal of comparator 50. Capacitor 48 is therefore normally charged to 3.5 volts. Diode 44 enables capacitor 48 to maintain the 3.5 volt voltage despite an indicating voltage at terminal 41 of less than 3.5 volts. Should the outputs +V1, +V2 or −V3 become excessively loaded or experience a short circuit that reduces the voltage thereat to less than 3.4 volts, the associated one of diodes 56, 58 and 60 will be forwarded biased. The output voltage associated with the forward biased diode is directly applied to the positive input of comparator 50 which, when it falls below 3.5 volts, results in the comparator 50 changing output states and operating latch 51. Latch 51 shuts down the PWM 18 when it is operated. This action is seen to occur irrespective of the magnitude of the current sensed by sensing transformer 30. Effectively, the "voltage reference" applied to comparator 50 is reduced when a short circuit condition exists at a protected output, i.e. one to which a diode is connected. It will be appreciated by those skilled in the art that not all outputs of the SMPS need be protected, but only those outputs that are capable of high current delivery, i.e. a high capacity output. The inverter 62 is shown protecting a negative output for illustrative purposes because negative power supply outputs do not generally have high current capability.

It will be further appreciated that capacitor 48 sustained the voltage at the negative terminal of comparator 50 even under short circuit conditions for a time sufficient to permit the voltage differential between the positive terminal and negative terminal to cause comparator 50 to change output states. This occurs when the voltage at the negative terminal is equal to or greater than the voltage at the positive terminal. It should also be noted that normal operation of the power supply is not affected by the presence of the inventive short circuit protection circuit.

Figure 2:
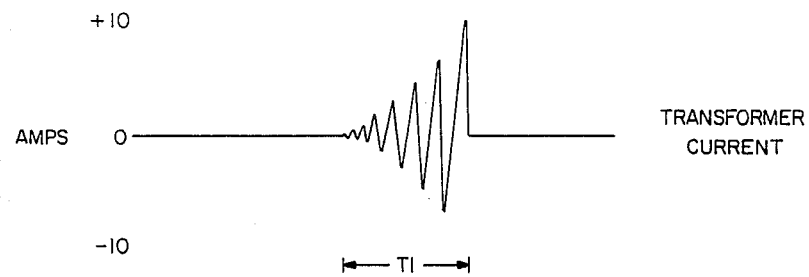
FIG. 2 are curves of input voltage and output current of a prior art switched mode power supply under a fault condition.
Figure 2:
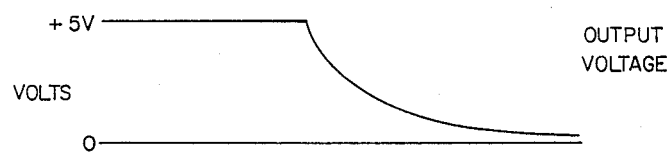

In FIG. 2, the transformer current flowing in the primary of power transformer 20 is illustrated when a short circuit occurs at a 5 volt high capacity output of a lightly loaded SMPS. The input trip current for the SMPS is set at 10 amperes. The period T1 illustrates the length of time (or number of cycles) before the short circuit at the output results in an input current of 10 amperes, e.g. sufficient to shut down the supply. The corresponding output voltage waveform illustrates the rate of decay of the voltage supplied to the shorted output terminal.

Figure 3:
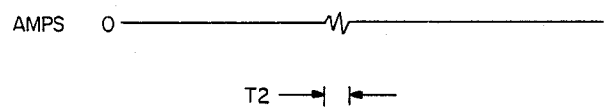
FIG. 3 are curves of input current and output voltage of a switched mode power supply incorporating the invention.
Figure 3:
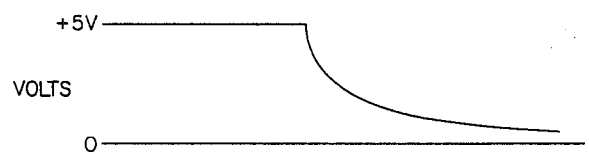

The FIG. 2 waveforms should be compared with those shown in FIG. 3 which represent similar conditions for an SMPS provided with the protection circuit of the invention. Note the short time period T2 and the very minimal increase in primary current that occurs before the power supply shuts down. The output voltage curve is also observed to decay very rapidly, which is a desirable condition.

It is thus seen that with the simple circuit of the invention, greatly enhanced shutdown characteristics are obtained for an SMPS. It is recognized that numerous changes in the described embodiment of the invention will be apparent to those skilled in the art without departing from its true spirit and scope. The invention is to be limited only as defined in the claims.

What is claimed is:

1. In a protection circuit for a switched mode power supply of the type having a high current output and including means for sensing input current, a pulse width modulator driving a transistor switch, and means for disabling the pulse width modulator when an input current overload is sensed including a source of reference voltage, a comparator coupled to said reference voltage source and a latch operated by the comparator for disabling the pulse width modulator, the improvement comprising:

means, including a diode coupled to said high current output, responsive to a large decrease in voltage at said high current output for overriding said input current sensing means and changing the voltage applied to said comparator by said reference voltage source to rapidly disable said pulse width modulator.

2. The circuit of claim 1 further including a resistor coupled between said source of reference voltage and one input of said comparator and a capacitor coupled to the other input of said comparator.

3. In a switched mode power supply including a high capacity voltage output, a pulse width modulator and input current sensing means, an improved protection circuit comprising:

a source of reference voltage;
   means coupled to said input current sensing means for producing an indicating voltage related to the magnitude of the input current;
   a comparator supplied with said reference voltage and said indicating voltage for changing state when a predetermined differential exists between said reference voltage and said indicating voltage;

a latch coupled to said pulse width modulator and to the output of said comparator for disabling said pulse width modulator responsive to a change in state of said comparator; and diode means coupled to said high capacity voltage output for rapidly attaining said predetermined differential by changing said reference voltage in response to large decreases in voltage at said high capacity voltage output.

4. The supply of claim 3 wherein said comparator has two input terminals, and an output terminal that is coupled to said latch, and wherein said reference voltage is resistively coupled to a first of said input terminals and said indicating voltage is coupled to a second of said input terminals.

5. The supply of claim 4, further including a resistor connected between said two input terminals; and wherein said diode means includes;

a diode connected between said first input terminal and said high capacity voltage output.

6. In a switched mode power supply including a high capacity voltage output, a pulse width modulator and input current sensing means, an improved protection circuit comprising:

a source of reference voltage;

a comparator including first and second input terminals and an output terminal;

a resistor connected between said source of reference voltage and said first input terminal;

a latch connected between said output terminal and said pulse width modulator;

means coupled to said input current sensing means for developing an indicating voltage as a function of input current;

a capacitor connected to said second input terminal and supplied with said indicating voltage; and a diode connected between said first input terminal and said high capacity voltage output, said diode conducting to electrically connect said first input terminal to said high capacity voltage output when the voltage at said high capacity voltage output decreases to a predetermined level.

7. The supply of claim 6, further including a plurality of high capacity voltage outputs, and further comprising a corresponding plurality of diodes for coupling said plurality of high capacity voltage outputs to said first input terminal.

8. The supply of claim 7, further including a high capacity voltage output of opposite polarity and further including a diode and an inverter connected between said opposite polarity high capacity voltage output and said first input terminal.

* * * * *